United States Patent [19]

Lajack

[11] 4,249,612
[45] Feb. 10, 1981

[54] ROTARY TILLER AND ATTACHMENT THEREFOR

[76] Inventor: Joseph Lajack, 3446 Berkshire, Warren, Mich. 48091

[21] Appl. No.: 19,278

[22] Filed: Mar. 9, 1979

[51] Int. Cl.$^2$ .................. A01B 33/02; B62D 51/06
[52] U.S. Cl. .................................. 172/43; 188/5; 280/5.32
[58] Field of Search .............. 172/42, 43, 80, 81, 172/256, 258, 259, 260, 387, 517, 738; 180/19 R, 19 S, 19 H; 188/5, 6; 280/1.181, 5.32, 188

[56] References Cited

U.S. PATENT DOCUMENTS

| | | | |
|---|---|---|---|
| 549,150 | 11/1895 | Page | 280/188 |
| 1,306,579 | 6/1919 | Cooper | 188/6 X |
| 1,318,419 | 10/1919 | Vathing et al. | 172/387 |
| 2,708,473 | 5/1955 | Gable et al. | 280/5.32 X |
| 2,751,028 | 6/1956 | Laughlin | 180/19 R |
| 2,788,731 | 4/1957 | Lindgren | 280/5.32 X |
| 3,282,353 | 11/1966 | Troyer et al. | 172/43 |
| 3,477,514 | 11/1969 | Woitas | 172/42 |
| 3,658,135 | 4/1972 | Thompson | 172/42 |
| 4,042,251 | 8/1977 | Rutan | 180/19 R X |

FOREIGN PATENT DOCUMENTS

| | | | |
|---|---|---|---|
| 486651 | 1/1918 | France | 180/19 R |
| 616071 | 1/1961 | Italy | 172/42 |
| 626527 | 10/1961 | Italy | 172/42 |

*Primary Examiner*—Richard T. Stouffer
*Attorney, Agent, or Firm*—Basile, Weintraub & Hanlon

[57] ABSTRACT

A travel attachment for rotary tillers is disclosed. The travel attachment comprises a fulcrum attached to a frame of the tiller, and a control bar longitudinally movable along the fulcrum including a lower end engagable with the ground. The upper end of the control bar is laterally movable by hand, and when the lower end of the control bar is engaged in the ground and the upper end is moved forward, a central portion of the bar engages the fulcrum forcing the fulcrum and tiller forward. A depth attachment attached to a forward end of the frame includes a horizontal foot of planar configuration with a forward portion curving upward in an arcuate manner. The foot is supported on the ground forward of the tiller and a vertical distance between a bottom surface of the foot and the bottom extension of the tiller blade determines the depth to which the earth will be tilled.

5 Claims, 4 Drawing Figures

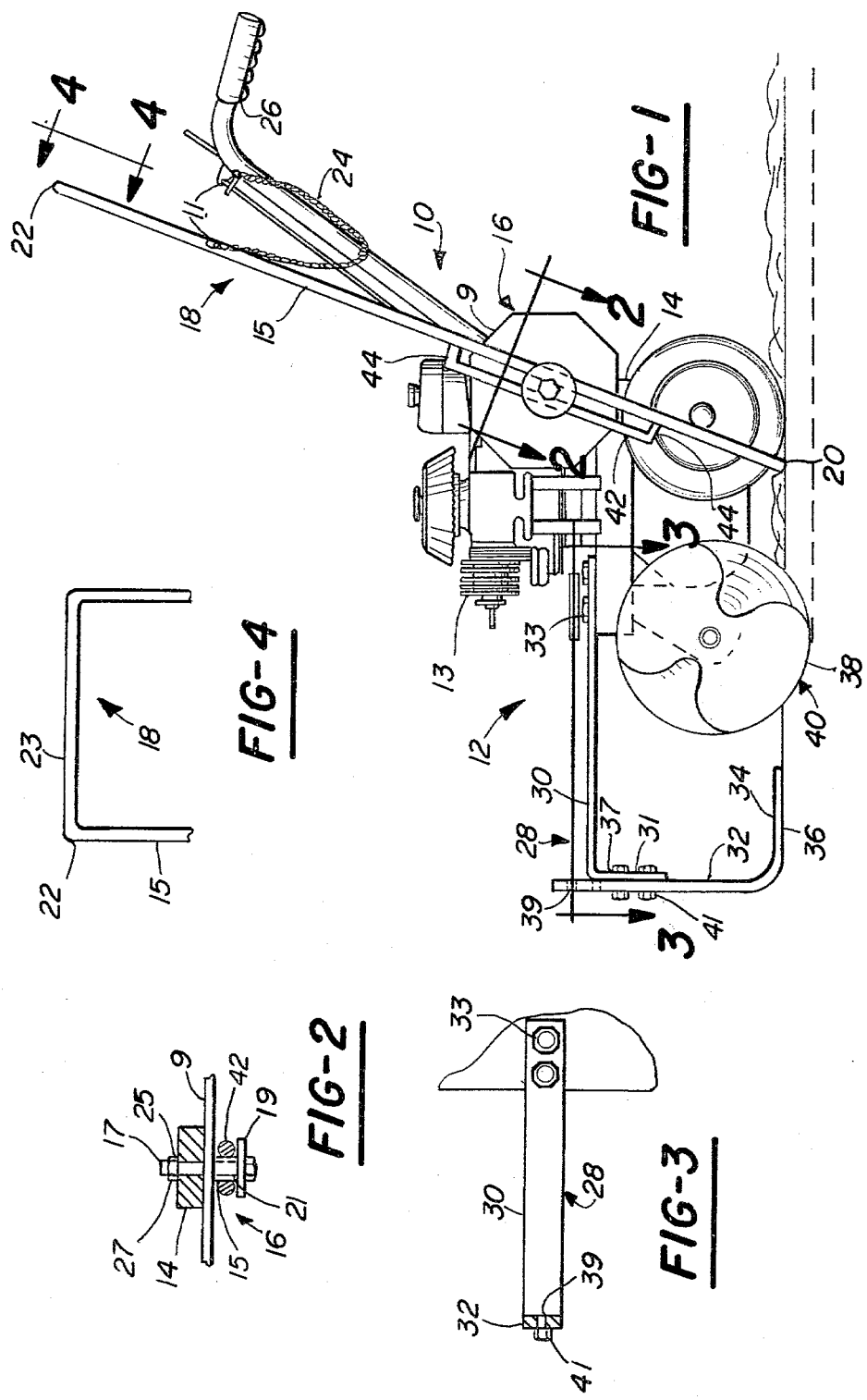

ROTARY TILLER AND ATTACHMENT THEREFOR

BACKGROUND OF THE INVENTION

I. Field of the Invention

The present invention relates to the field of rotary tillers, and more particularly to the field of rotary tillers having a device for moving the tiller along the ground. More particularly the present invention relates to the field of rotary tillers having a hand operated lever device for moving the tiller along the ground. Even more particularly the present invention relates to the field of rotary tillers having a hand operated lever for moving the tiller along the ground and a depth control device.

II. Prior Art Statement

Rotary tillers powered by an internal combustion engaine have long been known. Devices for moving the tiller along the ground generally include the action of the tiller blade engaging the earth to urge the tiller forward. In some designs the tiller has powered wheels to engage the ground and urge the tiller in the proper direction for translation over the ground.

Devices for controlling the depth to which the ground is tilled which have been disclosed in the part include a rod or foot attached to the rear end of the tiller engaging the solid ground beneath the tilled soil to control the depth to which the tiller blades engage the earth. Another prior device for controlling the depth to which the tiller blades engage the earth includes adjusting the height of the tillers ground engaging wheels relative to the tiller blade.

U.S. Pat. No. 3,282,353 discloses a rotary tiller having a ground engaging foot at the rear end of the tiller which is adjustable to vary the depth to which the cutter blades till the earth. This invention also discloses ground engaging wheels which are adjustable relative to the tiller blades to vary the depth to which they till the earth. U.S. Pat. No. 3,477,514 discloses a rotary tiller device which includes a foot behind the tiller which is attached to a frame for controlling the depth to which the tiller blades engage the earth. U.S. Pat. No. 3,658,135 discloses a rotary tiller employing a tapered augur mechanism which is self propelled. The augur desposits the tilled earth to the sides of the tiller to form rows in the earth as the tiller passes thereover.

None of the above cited Unites States patents disclose a travel attachment for a rotary tiller employing a manually operated lever device for laterally moving the tiller along the ground. None of the above listed United States patents disclose a depth attachment comprising a ground engaging horizontal foot attached to the frame of the tiller and disposed forward of the tiller blades.

SUMMARY OF THE INVENTION

The present invention comprises a travel attachment and depth control for a rotary tiller which includes a fulcrum attached to a frame of the tiller; a control bar longitudinally movable along the fulcrum with a lower end engageable with the ground and an upper end laterally movable by hand; a depth attachment comprising a horizontal bar affixed to the frame, the bar extending forward a distance, a vertical bar adjustably attached to the horizontal bar extending downward a distance, and a horizontal foot integral with the vertical bar, the foot having a planar configuration with a forward portion curving upward in an arcuate manner. An adjustable vertical distance between a bottom surface of the horizontal foot and a bottom extension of the tiller blade determines a depth the earth is tilled.

In operation the operator of the rotary tiller controls the travel of the device by engaging a lower end of the control bar in the ground and by either moving the upper end of the control bar forward or rearward a greater force is exerted upon the fulcrum to urge the rotary tiller forward or rearward. This force is preferably a 3 to 1 ratio.

A tether extending between a control handle of the tiller and an upper portion of the control bar limits the amount that the control bar can be moved forward. When the control bar has moved forward as far as the tether will permit, and the lower end of the control bar is engaging the ground, the control bar acts as a brake preventing further forward movement of the tiller.

For a more complete understanding of the present invention, reference is made to the following detailed description and accompanying drawing.

Other advantages and applications of the present invention will become apparent to those skilled in the field to which this invention pertains when the accompanying description of the best mode contemplated for practicing the invention is read in conjunction with the accompanying drawing.

BRIEF DESCRIPTION OF THE DRAWING

In the drawing, like reference numbers refer to like parts throughout the several views, and wherein:

FIG. 1 illustrates a side view of a rotary tiller employing the present invention;

FIG. 2 illustrates a partial cross sectional view through the handle of the tiller along the lines 2—2 of FIG. 1;

FIG. 3 represents a partial top view of the tiller of FIG. 1 taken along the lines 3—3 illustrating the depth attachment; and FIG. 4 illustrates an end view of the control bar upper portion taken along the lines 4—3 of FIG. 1.

DESCRIPTION OF THE PREFERRED EMBODIMENT

Referring now to the drawing and in particular to FIG. 1 wherein there is illustrated at 10 a preferred embodiment of a rotary tiller employing the present invention. The rotary tiller 12 has a frame portion 14 to which a pair of spaced apart fulcrums 16 are attached. A control bar 18 is longitudinally movable along the fulcrum 16 and has a lower end 20 engagable with the ground. An upper end of the control bar is laterally movable by hand either forward or rearward. When the lower end 20 of the control bar 18 is engaged with the ground and the upper end 22 is moved forward the bar 18 pushes the fulcrum 16 forward urging the rotary tiller 12 in a forward direction. When the lower end 20 of the control bar 18 is engaged with the ground, a rearward motion of the upper portion of the control bar 18 applys a force against the fulcrum 16 in a rearward direction halting the forward motion of the rotary tiller or moving its rearward.

A chain 24 is attached at one end to an upper portion of the control bar 18 and attached at the other end to a control handle 26 of the rotary tiller by a pair of rivets 11. The chain acts as a tether to restrict the forward movement of the control bar 18. When the control bar 18 has been moved forward as far as the tether will permit, with the lower end 20 of the control bar 18 engaging the ground, a rearward force is imposed on the fulcrum 16 to stop any further motion of the rotary tiller.

A depth attachment 28 is affixed to the forward end of the frame 14 of the rotary tiller 12 and comprises a horizontal bar 30 bolted to the frame 14 and extending forward a distance and then downward a distance. A vertical bar 32 is bolted to a downward extending end of the horizontal bar 30. The vertical bar extends downward a distance and then and then curves rearward in an arcuate manner extending horizontally rearward a distance to form a horizontal foot 34. The horizontal foot 34 is of planar configuration having a forward portion which curves upward in an arcuate manner. A bottom surface 36 of the horizontal foot 34 engages the ground forward of the rotary tiller. A vertical distance between the bottom surface and the bottom extension 38 of a tiller blade 40 determines the depth to which the earth is tilled. The depth attachment is optionally vertically adjustable using a plurality of apertures 39 in the vertical bar 32, to vary the depth to which the earth is tilled.

Referring again to the drawing and in particular to FIG. 1 the rotary tiller 12 comprises a frame 14 to which a prime mover 13, a pair of spaced apart control handles 26, the pair of spaced apart trunnions, and the depth attachment 28 are mounted. The tiller blade 40 is mechanically driven by the prime mover 13. The spaced apart fulcrums 16 are attached to the frame 14 by a bolt 17 (FIG. 2). Although a pair of fulcrums are employed only one fulcrum will be described herein. A pair of discs 9,19 are spaced apart by a tube 21 of reduced diameter and an opening through the center of the disc and the center of the tube allows the bolt 17 to pass therethrough. An aperture 25 through the frame 14 allows the bolt to pass therethrough and a threaded nut 27 threadingly engaging the bolt 17 secures the fulcrum 16 to the frame 14. Inner disc 9 has a substantially large diameter to laterally support the control bar along a portion of its length and prevent the lower end of the control bar from interfering with the tiller blade 40.

The control bar 18 comprises a pair of spaced apart longitudinal bars 15 including an upper end 22 and a lower end 20. The longitudinal bars 15 are spaced apart at their upper end by a handle portion 22 extending between bars 15 and integral therewith. Each longitudinal bar has a parallel bar 42 along a central portion thereof spaced from the longitudinal bar 15 a distance to straddle the reduced diameter tube 21. The spacing between the bar 15 and the parallel bar 42 along each bar 15 is established by a pair of end pieces 44 extending between each end of the parallel bars and the adjacent longitudinal bars 15. The longitudinal bars are slidable along the reduced diameter tube 21 between end pieces 44 and are retained by the discs 9 and 19.

The depth attachment 28 (FIG. 3) comprises the horizontal bar 30 which is bent at 90 degrees at its forward portion thereof to form a mounting flange 31 for the vertical bar 32. One or more bolts 33 pass through one or more apertures in the bar 30 to engage one or more threaded apertures in the frame 14 and secure the depth attachment 28 to the frame 14. The horizontal bar 30 extends forward a distance and then downward forming the mounting flange 31. One or more longitudinal apertures 37 pass through the mounting flange 31 for mounting the vertical bar 32. The vertical bar 32 has a plurality of apertures 39 passing therethrough one or more of which aligns with the apertures 37 in the horizontal bar, and one or more bolts 41 pass through the apertures 37 and 39 and a threaded nut threadingly engages the bolt end portion to attach the vertical bar 32 to the horizontal bar 30. The vertical bar 32 curves rearward to form the horizontal foot 34. A bottom surface 36 of the foot 34 rests on the untilled earth forward of the rotary tiller 12 and the vertical distance betewen the bottom surface 36 and the bottom extension 38 of the tiller blade 40 determines the depth to which the soil it tilled. By selecting the aperture 39 through which the bolts 41 are inserted, an adjustment of the depth to which the soil is tilled can be established.

The tether comprises the light chain 24 riveted at one end to the handle 26 and and at the other end to the longitudinal bar 15 by the plurality of rivets 11. When the blade 40 of the rotary tiller 12 is rotating and the machine is left unattended, the rotary tiller has a tendency to move forward. In the event that the machine is left unattended with the blade 40 rotating, the lower end 20 engages the ground and as the fulcrum 16 moves forward the upper end will rotate forward until restrained by the tether. When the upper end 22 is restrained by the tether the rotary tiller 12 is stopped and no further forward motion is permitted. It is to be appreciated from the foregoing disclosure that there has been described herein a travel attachment for a rotary tiller which gives the operator excellent control of the rotary tillers travel, and excellent control of the depth to which the earth is tilled.

Having thus described my invention what I claim is:

1. In a rotary tiller of the type including an engine driven rotary blade, a frame supporting the engine, and a rearwardly extending control handle attached to the frame, a travel attachment therefor, the travel attachment comprising:

a fulcrum attached to the frame;

a generally straight control bar longitudinally movable along the fulcrum including a lower end engageable with the ground and an upper end, said control bar being mounted so that said upper end is laterally movable by hand over a substantial distance in a forward and rearward direction by providing about the fulcrum the distance from the upper end to the fulcrum being greater than the distance from the lower end to the fulcrum; and wherein engaging the control bar lower end against the ground and moving the control bar upper end forward and rearward against the fulcrum forces the fulcrum and tiller in a similar direction in a controlled manner.

2. The travel attachment for a rotary tiller as defined in claim 1 further comprising:

a depth attachment comprising a horizontal bar affixed to the frame extending forward a distance, a vertical bar attached to the horizontal bar extending downward a distance then curving rearward forming a horizontal foot, and wherein a vertical distance between a bottom surface of the horizontal foot and a bottom extension of the tiller determines a depth the earth is tilled.

3. The travel attachment for a rotary tiller as defined in claim 2 wherein a vertical position of the foot relative to the frame is adjustable.

4. The travel attachment for a rotary tiller as defined in claim 1 further comprising:

said fulcrum comprising a pair of spaced apart fulcrum elements attached to the frame, each said fulcrum element having a pair of flanges spaced apart by a reduced diameter tube extending laterally;

the control bar further comprising a pair of spaced apart longitudinal bars, each said longitudinal bar having a parallel bar along a central portion thereof spaced from the longitudinal bar a distance to straddle the reduced diameter tube, said spacing established by a pair of end pieces extending between each end of the parallel bars and the longitudinal bars, the control bars pivotable and slidable along the reduced diameter tube between end pieces and retained by the flanges, the longitudinal bars spaced apart by a portion of said control handle extending between the upper ends thereof.

5. The travel attachment for a rotary tiller as defined in claim 4 further comprising:

a tether between an upper part of the control handle and an upper portion of the control bar, said tether limiting a forward excersion of the upper portion while the lower portion of the control bar engages the ground preventing further forward motion of the tiller.

* * * * *